US008981691B2

(12) United States Patent
Arai et al.

(10) Patent No.: US 8,981,691 B2
(45) Date of Patent: Mar. 17, 2015

(54) MOTOR DRIVE APPARATUS

(71) Applicant: Denso Corporation, Kariya, Aichi-pref. (JP)

(72) Inventors: Kanta Arai, Kariya (JP); Hideki Kabune, Nagoya (JP); Yasuhiko Mukai, Anjo (JP)

(73) Assignee: Denso Corporation, Kariya (JP)

( * ) Notice: Subject to any disclaimer, the term of this patent is extended or adjusted under 35 U.S.C. 154(b) by 70 days.

(21) Appl. No.: 13/855,309

(22) Filed: Apr. 2, 2013

(65) Prior Publication Data
US 2013/0257328 A1 Oct. 3, 2013

(30) Foreign Application Priority Data

Apr. 2, 2012 (JP) ................................. 2012-83876

(51) Int. Cl.
*H02H 7/09* (2006.01)
*H02P 29/02* (2006.01)
*H02P 25/22* (2006.01)

(52) U.S. Cl.
CPC ............ *H02P 29/022* (2013.01); *H02P 29/021* (2013.01); *H02P 29/028* (2013.01); *H02P 25/22* (2013.01)
USPC ........ 318/400.22; 318/490; 318/139; 363/37; 363/56.02; 363/68; 307/9.1

(58) Field of Classification Search
None
See application file for complete search history.

(56) References Cited

U.S. PATENT DOCUMENTS

| 4,359,655 | A | * | 11/1982 | Fukui | 327/397 |
| 4,445,167 | A | * | 4/1984 | Okado | 363/56.02 |
| 5,969,919 | A | * | 10/1999 | Kobayashi et al. | 361/23 |
| 2006/0055365 | A1 | | 3/2006 | Kifuku et al. | |
| 2011/0156629 | A1 | | 6/2011 | Satou et al. | |
| 2011/0205672 | A1 | | 8/2011 | Sakai | |
| 2011/0316466 | A1 | * | 12/2011 | Uryu | 318/490 |
| 2012/0098361 | A1 | | 4/2012 | Yamasaki et al. | |

FOREIGN PATENT DOCUMENTS

| CN | 101958553 A | * | 1/2011 |
| JP | 2001-292578 | | 10/2001 |
| JP | 2005-304119 | | 10/2005 |
| JP | B2-4546895 | | 9/2010 |

OTHER PUBLICATIONS

Office Action (2 pages) dated Feb. 12, 2014, issued in corresponding Japanese Application No. 2012-083876 and English translation (2 pages).

* cited by examiner

*Primary Examiner* — Eduardo Colon Santana
*Assistant Examiner* — Cortez Cook
(74) *Attorney, Agent, or Firm* — Nixon & Vanderhye P.C.

(57) ABSTRACT

When a failure detection part detects a failure in an inverter circuit in a first power supply system, a drive control part stops the inverter circuit from driving a motor. An on/off control part turns off a first power supply relay of a power supply on/off part. Under a state that the inverter circuit stops a motor driving operation, a first coil set of the motor generates an induced voltage by rotation caused by an external force. The induced voltage is regenerated to a battery from the inverter circuit through a second power supply relay and a parasitic diode of the first power supply relay. Thus, circuit elements in the power supply system, which is failing, are protected from breaking down.

2 Claims, 3 Drawing Sheets

MOTOR DRIVE APPARATUS

CROSS REFERENCE TO RELATED APPLICATION

This application relates to and incorporates herein by reference Japanese patent application No. 2012-83876 filed on Apr. 2, 2012.

TECHNICAL FIELD

The present disclosure relates to a motor drive apparatus for driving a motor, which may be used in an electric power steering system of a vehicle, for example.

BACKGROUND

A conventional motor drive apparatus has a plurality of inverter circuits, which supply electric power to coil sets of a motor. When any one of the inverter circuits or any one of the coils sets fails, the motor drive apparatus continues power supply to the motor by only other inverter circuits operating normally.

For example, according to a motor drive apparatus for an electric power steering system disclosed in JP-A-2011-131860 (US 2011/0156629 A1), power supply relays are provided in power supply branch paths connecting a DC battery and inverter circuits of two power supply systems. When either one of the inverter circuits fails, one power supply relay connected to the inverter circuit of the power supply system, which is failing, is turned off to interrupt the power supply and the motor is driven by only the other inverter circuit of the power supply system, which is operating normally.

Such a relay as used for interrupting the power supply from the battery to the inverter circuit may be a mechanical relay or a semiconductor relay. The semiconductor relay is used in more instances in view of space restraint and cost restraint. As the semiconductor relay, a MOSFET is used in more instances in a 12V-power supply system in view of its on-resistance and saturation voltage loss. The MOSFET has a parasitic diode. In view of a possibility that a power source is connected in reverse polarity through error, two MOSFETs are connected in series so that flow directions of free-wheeling currents of respective parasitic diodes are opposite to each other.

A motor generally operates as a generator, which generates an induced voltage when its rotary shaft is rotated by an external force. In an electric power steering system of a vehicle, for example, a motor is rotated by an external force when a tire wheel of a vehicle hits and runs on an obstacle and the like.

In this case, the energy of the induced voltage is regenerated to a battery from an inverter circuit through a power supply relay in a power supply system, in which the power supply relay is in the turned-on state. In a power supply system, which is failing, a power supply relay is turned off and all switching elements in the inverter circuit are turned off. Thus no current path for regenerating the induced voltage is provided. The induced voltage thus becomes excessively high and possibly breaks down circuit elements.

SUMMARY

It is therefore an object of the present disclosure to provide a motor drive apparatus for driving a motor.

According to one aspect, a motor drive apparatus is provided for driving a motor including a plurality of coil sets, each of which is formed of coils of a plurality of phases. The motor drive apparatus comprises a plurality of inverter circuits, an electric power supply on/off control circuit, a failure detection part, a drive control part and an on/off control part.

The plurality of inverter circuits is provided in correspondence to the plurality of coil sets and supplies electric power to the plurality of coil sets by converting an electric power supplied form an electric power source.

The electric power supply on/off control circuit is provided in each power supply system between the electric power source and the inverter circuit and electrically conducts and interrupts the electric power source to and from the inverter circuit.

The failure detection part detects a failure in the inverter circuit in each power supply system.

The drive control part stops the inverter circuit in a failing power supply system from driving the motor. The failing power supply system corresponds to the power supply system having the failure detected by the failure detection part.

The on/off control part controls the electric power supply on/off circuit of the failing power supply system to a regenerative current conduction state when the failure detection part detects the failure. The regenerative current conduction state allows the regenerative current to flow in a direction from the inverter circuit to the electric power source.

BRIEF DESCRIPTION OF THE DRAWINGS

The above and other objects, features and advantages of a motor drive apparatus will become more apparent from the following detailed description made with reference to the accompanying drawings. In the drawings.

DETAILED DESCRIPTION OF THE EMBODIMENT

Figure 1:
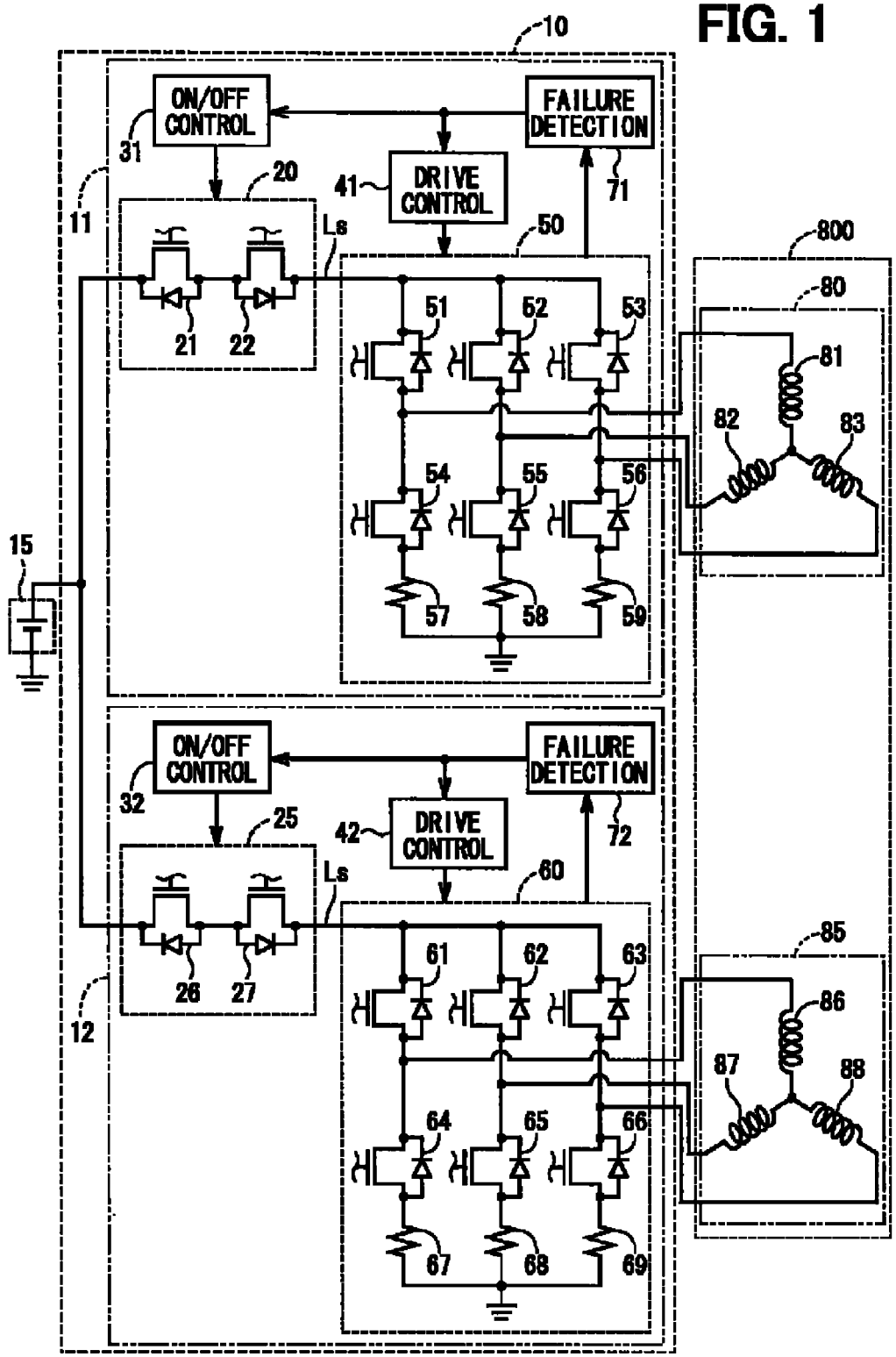
FIG. 1 is a circuit diagram of a motor drive apparatus according to one embodiment.
Figure 2:
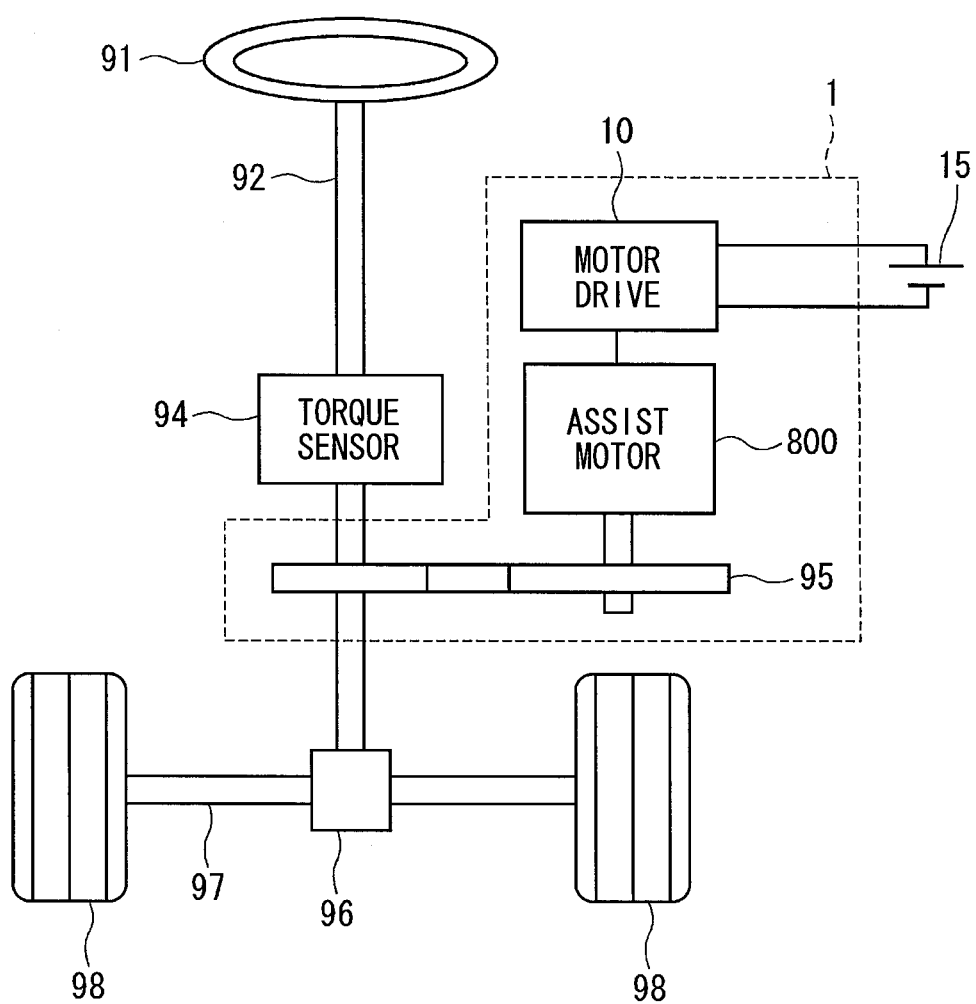
FIG. 2 is a schematic view of an electric power steering system, in which the motor drive apparatus according to the embodiment is incorporated.

A motor drive apparatus is configured as shown in FIG. 1 and incorporated in an electric power steering system for a vehicle as shown in FIG. 2, according to one embodiment.

As shown in FIG. 2, an electric power steering system 1 is configured to provide a steering assist torque to a steering shaft 92 for assisting a steering torque of a driver. A torque sensor 94 is attached to a steering shaft 92, which is coupled to a steering wheel 91, for detecting the steering torque. A pinion gear 96 is attached to a top end of the steering shaft 92 and engaged with a rack shaft 97. A pair of tire wheels 98 is rotatably coupled to both ends of the rack shaft 97 through tie rods and the like. The pinion gear 96 converts a rotary movement of the steering shaft 92 to a linear movement of the rack shaft 96 so that the pair of tire wheels 98 is steered by an angle corresponding to an amount of the linear movement of the rack shaft 97.

The electric power steering system 1 is formed of a steering assist motor 800, a speed reduction gear 95 and a motor drive apparatus 10. The steering assist motor 800 generates the steering assist torque. The speed reduction gear 95 is a motive power transfer device, which transfers the rotary output of the motor 800 to the steering shaft 92 after motor rotation speed reduction. The motor 800 is a three-phase AC brushless motor, for example.

As shown in FIG. 1, the motor 800 includes two coils sets 80 and 85. The first coil set 80 is formed of three phase coils 81, 82 and 83 for a U-phase, a V-phase and a W-phase, respectively. The second coil set 85 is formed of three phase coils 86, 87 and 88 for a U-phase, a V-phase and a W-phase, respectively. The motor drive apparatus 10 is configured to drive the motor 800 by converting a DC electric power supplied from a DC battery 15, which is an electric power source. The motor drive apparatus 10 is formed of a first drive unit 11 and a second drive unit 12. The first drive unit 11 includes a first inverter circuit 50, which is provided in correspondence to the first coil set 80. The second drive unit 12 includes a second inverter circuit 60, which is provided in correspondence to the second coil set 85. The first drive unit 11 and the second drive unit 12 are connected to the battery 15 and the motor 800 in parallel. One drive unit and one coil set connected to the drive unit forms one power supply system in combination. Thus the motor drive apparatus 10 forms two (first and second) power supply systems.

The drive unit 11 of the first power supply system and the drive unit 12 of the second power supply system are generally the same in configuration. The drive unit 11 will be described below in detail as a representative example. The drive unit 11 of the first power supply system includes an electric power supply on/off circuit 20, the inverter circuit 50 and a control circuit, which includes an on/off control part 31, a drive control part 41 and a failure detection part 71. Each part in the control circuit may be formed of a microcomputer and pre-drivers, for example.

The power supply on/off circuit 20 is provided in one power supply line Ls between the battery 15 and the inverter circuit 50 and electrically conducts and interrupts the battery 15 to and from the inverter circuit 50. The electric power supply on/off circuit 20 is formed of a first power supply relay 21 and a second power supply relay 22, which are connected in series.

The first power supply relay 21 provided as a first on/off switch and the second power supply relay 22 provided as a second on/off switch are semiconductor switching elements, which include respective parasitic diodes. The parasitic diode of the first power supply relay 21 is arranged to conduct a current in a direction from the inverter circuit 50 to the battery 15. The parasitic diode of the second power supply relay 22 is arranged to conduct a current in a direction from the battery 15 to the inverter circuit 50.

The on/off control part 31 may be implemented as a function of the microcomputer to control on/off states of the first power supply relay 21 and the second power supply relay 22 separately from each other. Specifically, the on/off control part 31 is capable of not only turning on or off both of the first power supply relay 21 and the second power supply relay 22 but also turning off the first power supply relay 21 and turning on the second power supply relay 22. In the following description, "turn off" and "interrupt" are used to mean the same operation in respect to the on/off operation of the semiconductor switching element. Similarly, "turn on" and "conduct" are used to mean the same operation.

In a case that the battery 15 is connected in a normal direction as shown in FIG. 1, that is, the first power supply relay 21 is connected to the positive electrode side of the battery 15, the electric power supply from the battery 15 to the inverter circuit 50 is interrupted when the first power supply relay 21 is turned off. In a case that the battery 15 is connected in a reverse direction as opposed to FIG. 1, that is, the first power supply relay 21 is connected to the ground electrode side of the battery 15, no voltage is supplied to the drive unit 11 and hence all the switching elements in the drive unit 11 are turned off. However, a current flows through the parasitic diode of the first power supply relay 21 and hence the battery 15 and the inverter circuit 50 are not interrupted. In this instance, with the second power supply relay 22 being connected in series with the first power supply relay 21, the electric power supply from the battery 15 to the inverter circuit 50 is interrupted.

With the electric power supply on/off circuit 20 formed of the power supply relays 21 and 22 having the parasitic diodes connected in opposite current flow directions, the electric power supply from the battery 15 to the inverter circuit 50 is interrupted irrespective of the direction of connection of the battery 15, when both of the power supply relays 21 and 22 are turned off.

The inverter circuit 50 is a three-phase inverter, in which six semiconductor switching elements 51 to 56 are connected in a bridge form. The switching elements 51 to 56 are, for example, MOSFETs, that is, metal-oxide-semiconductor field-effect transistors. The switching elements 51 to 56 are referred to as FETs 51 to 56.

The FETs 51 and 54 form a high-side arm and a low-side arm of the U-phase. The FETs 52 and 55 form a high-side arm and a low-side arm of the V-phase. The FETs 53 and 56 form a high-side arm and a low-side arm of the W-phase. Each of the FETs 51 to 56 is turned on or off between a source and a drain in correspondence to a gate potential.

The FETs 51, 52 and 53 of the high-side arms are connected to the power supply line Ls at respective drains. Sources of the FETs 51, 52 and 53 of the high-side arms are connected to drains of the FETs 54, 55 and 56 of the low-side arms, respectively. Sources of the FETs 54, 55 and 56 of the low-side arms are grounded through shunt resistors 57, 58 and 59, respectively. Junctions between the FETs 51, 52 and 53 of the high-side arms and the FETs 54, 55 and 56 of the low-side arms are connected to terminals of the coils 81, 82 and 83 of the first coil set 80, respectively.

The drive control part 41 is formed of a pre-driver, for example. The FETs 51 to 56 are turned on and off by switching signals outputted to the respective gates from the drive control part 41, so that the power supply to the first coil set 80 may be switched over. The inverter circuit 50 thus converts the DC power supplied form the battery 15 to the three-phase AC power. The failure detection part 71 detects a failure of the inverter circuit 50, specifically a short-circuit failure or the like in the FETs 51 to 56, and applies a failure detection signal to the on/off control part 31 and the drive control part 41.

The drive unit 12 of the second power supply system includes, similarly to the first power supply system, an electric power supply on/off circuit 25, the inverter circuit 60 and a control circuit, which includes an on/off control part 32, a drive control part 42 and a failure detection part 72. The electric power supply on/off circuit 25 is formed of a first power supply relay 26 and a second power supply relay 27. The inverter circuit 60 includes FETs 61 to 66 and shunt resistors 67 to 69.

The motor drive apparatus 10 is thus formed of two drive units 11 and 12. Even in a case that the inverter circuit 50 or 60 or the coil set 80 or 85 in one of power supply systems fails, only one system, which is normal (normal system), is driven to operate, while stopping the other system, which is in failure (failing system), from operating. As a result, the motor 800 is continuously driven to operate. It is thus possible to avoid a situation, in which the electric power steering system 1 suddenly stops generation of the steering assist power due to a failure in one of the power supply systems.

The operation of the motor drive apparatus 10, which is attained upon failure of one of the two power supply systems, will be described next with reference to FIG. 3. It is assumed here that the inverter circuit 50 of the first power supply system fails and the inverter circuit 60 of the second power supply system operates normally. When the failure detection part 71 detects a failure of the inverter circuit 50, the failure detection signal is applied to the on/off control part 31 and the drive control part 41. The drive control part 41 responsively turns off all the switching elements 51 to 56 to thereby stop the inverter circuit 50 from driving the motor 800. The on/off control part 31 turns off and on the first power supply relay 21 and the second power supply relay 22 in the electric power supply on/off circuit 20, respectively. That is, the on/off control part 31 provides a regenerative current conduction state, which enables a regenerative current to flow from the inverter circuit 50 to the battery 15.

It is further assumed that the first coil set 80 and the second coil set 85 generate induced voltages in response to an external force applied under a state that the inverter circuit 50 of the first power supply system is stopped from operating. In the second power supply system operating normally, the currents, which flow through the parasitic diodes of the FETs 65 and 66 of the low-side arms of the V-phase and the W-phase in the upward directions (from low potential side to the high potential side), flows to a neutral point of a star-connected coils 86 to 88 of the second coil set 85 through the V-phase coil 87 and the W-phase coil 88 as shown by dotted arrows in FIG. 3. The current, which flows out from the neutral point, flows through the U-phase coil 86 and the parasitic diode of the FET 61 of the high-side arm of the U-phase in the upward direction to the power supply line Ls of the second power supply system.

In the second power supply system operating normally, the on/off control part 32 keeps turning on both of the first relay 26 and the second relay 27 in the electric power supply on/off circuit 25. The current thus flows to the battery 15 from the power supply line Ls through the second power supply relay 27 and the first power supply relay 26. As a result, circuit elements of the drive unit 12 are protected from being broken by the induced voltage.

Figure 3:
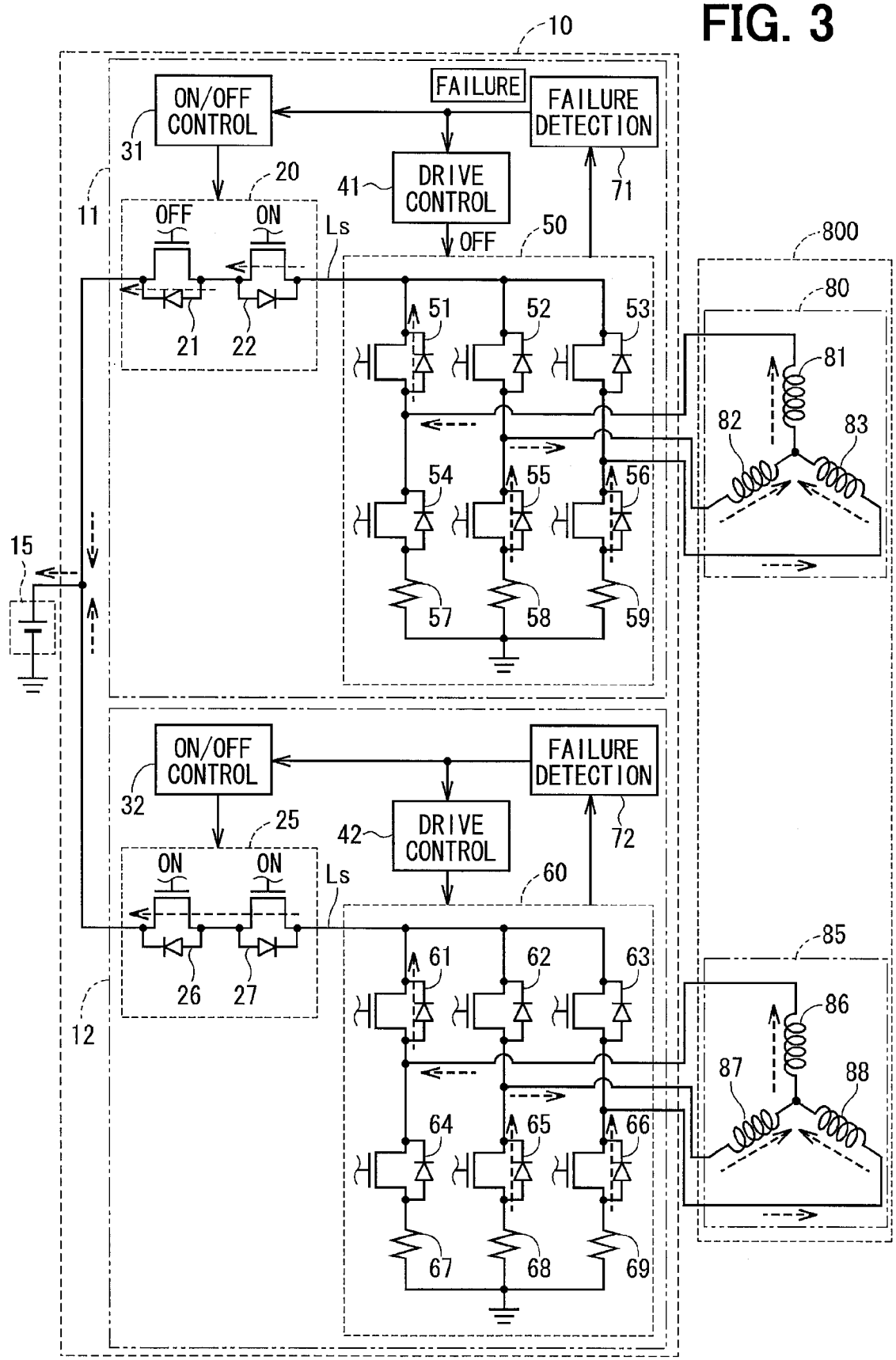
FIG. 3 is a circuit diagram showing an operation of the motor drive apparatus shown in FIG. 1.

In the first power supply system, which is failing, the currents, which flow through the parasitic diodes of the FETs 55 and 56 of the low-side arms of the V-phase and the W-phase in the upward directions (from the low potential side to the high potential side), flows to a neutral point of a star-connected coils 81 to 83 of the first coil set 80 through the V-phase coil 82 and the W-phase coil 83 as shown by dotted arrows in FIG. 3. The current, which flows out from the neutral point, flows through the U-phase coil 81 and the parasitic diode of the FET 51 of the high-side arm of the U-phase in the upward direction to the power supply line Ls of the first power supply system.

If the on/off control part 31 of the failing power supply system turns off both of the first power supply relay 21 and the second power supply relay 22 in the electric power supply on/off circuit 20, the power supply from the battery 15 to the inverter circuit 15 is interrupted entirely. In this case, no route is provided to allow the regenerative current to flow from the power supply line Ls to the battery 15. As a result, it is likely that circuit elements such as the second power supply relay 22 or the like may be broken by the induced voltage applied to the power supply line Ls.

According to the motor drive apparatus 10 of the present embodiment, the on/off control part 31 of the failing system turns off and on the first power supply relay 21 and the second power supply relay 22 of the electric power supply on/off circuit 20, respectively. Thus the current is allowed to flow from the power supply line Ls to the battery 15 through the second power supply relay 22 and the parasitic diode of the first power supply relay 21. It is therefore possible to protect the circuit elements of the drive unit 11 from being broken by the induced voltage, similarly to the system operating normally.

As described above, the motor drive apparatus 10 according to the present embodiment can lead the induced voltage generated in the motor 800 to the battery 15 in any of the normal system and the failing system, even when one of the two systems fails. For example, in the electric power steering system 1, when a tire wheel hits and ride on an obstacle while a vehicle is traveling with its one of the two power supply systems being in failure, the induced voltages are generated in both of the power supply systems and regenerated to the battery 15, whether operating normally or not. It is thus possible to protect circuit elements of the drive units 11 and 12 from being broken down by the induced voltages.

Exemplifying the first power supply system, the on/off control part 31 controls independently the first power supply relay 21 and the second power supply relay 22 of the electric power supply on/off circuit 20 in such a manner that the first power supply relay 21 and the second power supply relay 22 turn off and on, respectively. If it is not possible to control the relays 21 and 22 independently, both of the first power supply relay 21 and the second power supply relay 22 need be turned on at the same time in case that the second power supply relay 22 is turned on. That is, it is not possible to provide a function of interrupting the power supply from the battery 15 to the inverter circuit 50, which is in the failing system. According to the present embodiment, however, it is possible to interrupt the power supply from the battery 15 to the inverter circuit 50 of the failing system and ensure a current regeneration route by turning off the first power supply relay 21 and turning on the second power supply relay 22.

The motor drive apparatus 10 described above may be modified as follows.

(A) In the embodiment, each electric power supply on/off circuit is formed of a series connection of one first power supply relay and one second power supply relay. Alternatively, two or more of at least one of the first power supply relay and the second power supply relay may be connected in series. Alternatively, the electric power supply on/off circuit may be formed of only the first power supply relay. In this instance, the regenerative current, which is generated when the first power supply relay is in the off-state, is allowed to flow from the inverter circuit to the power source through the parasitic diode of the first power supply relay.

(B) In the embodiment, the on/off control part, the drive control part and the failure detection part are provided for each of the first power supply system and the second power supply system. This is only for the functional explanation and does not necessarily mean that those parts are separated physically. That is, these parts in each power supply system may be implemented in a control program of a microcomputer.

(C) The semiconductor switching element may be other than the MOSFET as far as such an element includes a parasitic diode.

(D) The number of power supply systems of the motor drive apparatus is not limited to two but may be three or more. The number of phases of the motor is not limited to three but may be four or more.

(E) The motor drive apparatus is not limited to an application to the steering assist motor of the electric power steering system but may be applied to other motors.

What is claimed is:

1. A motor drive apparatus for driving a motor including a plurality of coil sets, each of which is formed of coils of a plurality of phases, the motor drive apparatus comprising:
    a plurality of inverter circuits, which is provided in correspondence to the plurality of coil sets and supplies electric power to the plurality of coil sets by converting an electric power supplied from an electric power source;
    an electric power supply on/off control circuit, which is provided in each power supply system between the electric power source and the inverter circuit and electrically conducts and interrupts the electric power source to and from the inverter circuit;
    a failure detection part, which detects a failure in the inverter circuit in each power supply system;
    a drive control part, which stops the inverter circuit in a failing power supply system from driving the motor, the failing power supply system corresponding to the power supply system having the failure detected by the failure detection part; and
    an on/off control part, which controls the electric power supply on/off circuit of the failing power supply system to a regenerative current conduction state when the failure detection part detects the failure, the regenerative current conduction state allowing the regenerative current to flow in a direction from the inverter circuit to the electric power source, wherein:
    the electric power supply on/off circuit includes a series connection of at least one first on/off switch and at least one second on/off switch;
    the first on/off switch is a semiconductor switching element having a parasitic diode, which allows a current to flow only in a direction from the inverter circuit to the electric power source;
    the second on/off switch is a semiconductor switching element having a parasitic diode, which allows only a current to flow only in a direction from the electric power source to the inverter circuit, and wherein
    the on/off control part is capable of controlling the first on/off switch and the second on/off switch independently; and
    the on/off control part turns off the first on/off switch and turns on the second on/off switch in the failing power supply system, when the failure detection part detects the failure.

2. An electric power steering system comprising:
    the motor drive apparatus according to claim 1;
    a steering assist motor, which is driven by the motor drive apparatus to generate a steering assist torque for assisting a steering force of a driver; and
    a power transfer device, which transfers a rotation of the steering assist motor to a steering shaft.

* * * * *